United States Patent

Ichino et al.

[11] Patent Number: 5,839,495
[45] Date of Patent: Nov. 24, 1998

[54] METHOD OF MANUFACTURING ROLL FOR HOT ROLLING

[75] Inventors: Kenji Ichino; Tomoya Koseki; Yoshitaka Sawa, all of Aichi, Japan

[73] Assignee: Kawasaki Steel Corporation, Kobe, Japan

[21] Appl. No.: 932,691

[22] Filed: Sep. 18, 1997

Related U.S. Application Data

[62] Division of Ser. No. 494,971, Jun. 26, 1995, Pat. No. 5,674,171.

[30] Foreign Application Priority Data

Jun. 29, 1994 [JP] Japan .................................. 6-168643
Feb. 14, 1995 [JP] Japan .................................. 7-047958

[51] Int. Cl.$^6$ ............................................. B23P 15/00
[52] U.S. Cl. ............................. 164/95; 29/895.32; 492/3; 492/54; 492/58
[58] Field of Search ............................. 29/895.32, 895; 492/3, 54, 58; 164/95, 96, 114

[56] References Cited

U.S. PATENT DOCUMENTS 3,929,518  12/1975  Akahori et al. .
5,316,596   5/1994  Kataoka .

FOREIGN PATENT DOCUMENTS 0348293  12/1989  European Pat. Off. .
3237985  10/1982  Germany .
1292621  10/1970  United Kingdom .

*Primary Examiner*—Irene Cuda
*Attorney, Agent, or Firm*—Dvorak & Orum

[57] ABSTRACT

A roll outer layer material for hot rolling includes, as analyzed in weight percent, of 2.5–4.0% C, 6.0–20% Cr, 3.0–10.0% V, 0.6–5.0% Nb, 2.0–15% Mo, 3.0% or below Si, 3.0% or below Mn, C, V, Nb and Cr satisfying a following formula (1), $$10.5(\%) \leq 6.5 \cdot C(\%) - 1.3 \cdot V(\%) - 0.7 \cdot Nb(\%) \leq 2 \cdot Cr(\%) - 2(\%) \quad (1)$$

, and the balance being Fe and incidental impurities. A method of manufacturing a roll for hot rolling includes the steps of centrifugally casting an outer layer material having the above composition, centrifugally casting graphite steel containing 0.5% or above of C as an intermediate layer, and casting an axis material which is a spheroidal graphite cast iron, a flake graphite cast iron or a graphite steel. C is present in the intermediate layer in an amount which satisfies a following formula (2), $$C \text{ (intermediate layer)} \geq 2.0 - 0.5 \text{ (C} - 0.2 \text{ V} - 0.11 \text{ Nb)(outer layer)} \quad (2)$$

6 Claims, 6 Drawing Sheets

**AMOUNT OF ROLLING TONS PER UNIT OF ROLL DIAMETER

METHOD OF MANUFACTURING ROLL FOR HOT ROLLING

This is a divisional of application Ser. No. 08/494,971 filed on Jun. 26, 1995, now U.S. Pat. No. 5,674,171.

BACKGROUND OF THE INVENTION

1. Field of the Invention

The present invention relates to a roll outer layer material for hot rolling steel which exhibits excellent resistance to surface deterioration and wear resistance and elimination of accidents, such as breakage of the roll during manufacture or rolling, as well as a method of manufacturing a roll for hot rolling.

2. Description of the Related Art

To manufacture hot rolled steel plates or strips, a slab having a thickness ranging from 130 to 300 mm and manufactured by the continuous casting process or by blooming is heated by a heating furnace, and then hot rolled by a rough rolling mill and a finish rolling mill to obtain a strip having a thickness ranging from 1.0 to 25 mm. After the thus-obtained strip is coiled by a coiler, it is cooled. The cooled strip is subjected to various finish operations such as cutting, slitting, marking, bundling etc., in finish lines. In the work roll of a conventional finish rolling mill, a high Cr cast iron, Adamite, or a Ni grain cast iron or the like is used as the outer layer material, and a gray cast iron or a ductile cast iron exhibiting excellent toughness is used as the inner layer material. The work roll of a conventional finish rolling mill is a composite roll manufactured by centrifugally casting these outer and inner layer materials.

In recent years, rolling conditions tend to become severe and an improvement in the productivity of rolling has been required. Hence, there has been a demand for rolling rolls exhibiting higher wear resistance.

To meet such requirements, for example, Japanese Patent Laid-Open Nos. Sho 60-124407 and Sho 61-177355 have proposed the use of a high V cast iron as the outer layer material manufactured by the centrifugal casting process.

However, when used as the outer layer material of a roll manufactured by centrifugal casting, a high V cast iron has a disadvantage in that a V carbide having a small specific gravity is centrifugally separated, thus making the characteristics of the roll outer layer material non-uniform in the direction of thickness thereof. Hence, it has been proposed in, for example, U.S. Pat. No. 5,316,596 and Japanese Patent Laid-Open Nos. Hei 4-365836, Hei 5-1350 and Hei 5-339673 to add Nb to prevent segregation.

More specifically, it has been found that in a composite carbide of Nb and V, segregation of a carbide in primary crystal is reduced because the specific gravity of the composite carbide is higher than that of the V carbide (specific gravity: 5.77) and closer to the specific gravity (7.0) of the molten metal than the V carbide. Accordingly, it has been proposed to make a Nb/V ratio 2.0 or above and basically to not add W in order to prevent segregation of an eutectic carbide.

Although the above-described high V and high V—Nb roll outer layer materials are advantageous in terms of the improvement of the wear resistance, the present inventors found that a hard V or Nb carbide (MC carbide) in the high V or high V—Nb material tend to form projected parts near the surface of the roll during rolling. Such parts act as spikes and increase the coefficient of friction between a rolled material and the surface of the roll. Accordingly, a roll having an outer layer made of such a high V or high V—Nb material has the following disadvantages:

(a) Rolling load is increased excessively.

(b) Secondary scale is generated in the surface of a rolled material due to frictional heat, thus generating surface roughening of the rolled material.

(c) The roll surface is damaged due to excessive frictional heat generated during rolling under a high pressure, thus generating surface roughening of the rolled material.

Furthermore, since wear resistance of the roll is improved and the useful life of a roll before roll changing is thus increased, another problem involving spalling of the roll surface (hereinafter referred to as "banding") is encountered during rolling. This is due to fatigue occurred at the portion of the roll located immediately below the surface thereof.

The above-described problems (a) to (c) are remarkable in a roll used under an environment of large heat load, such as a roll for use in a hot rolling stand in a front stage of finish strip mill.

Furthermore, since wear resistance of the roll is improved, the load applied to the roll is usually increased. Thus, there is the possibility that a very small defect generated in the roll during manufacture thereof leads to an accident, such as breakage of a roll.

SUMMARY OF THE INVENTION

In view of the aforementioned problems of a conventional roll outer layer material, an object of the present invention is to provide a roll outer layer material which exhibits excellent wear resistance and has a low coefficient of friction in order to solve the problems (a) to (c).

Another object of the present invention is to provide a roll outer layer material which eliminates banding which would occur when a roll is used over a long period.

Still another object of the present invention is to provide a method of manufacturing a roll for hot rolling which has no defect therein and thus prevents breakage during the use of the roll.

The present invention provides a roll outer layer material for hot rolling which consists essentially, as analyzed in weight percent, of 2.5–4.0% C, 6.0–20% Cr, 2.0–15% Mo, 3.0–10.0% V, 0.6–5.0% Nb, 3.0% or below Si, 3.0% or below Mn, C, V, Nb and Cr satisfying a formula (1)

$$10.5(\%) \leq 6.5 \cdot C(\%) - 1.3 \cdot V(\%) - 0.7 \cdot Nb(\%) \leq 2 \cdot Cr(\%) - 2(\%) \quad (1)$$

with the balance of Fe and incidental impurities.

The present invention further provides a method of manufacturing a roll for hot rolling, which comprises the steps of:

centrifugally casting an outer layer material consisting essentially, as analyzed in weight percent, of 2.5–4.0% C, 6.0–20% Cr, 3.0–10.0% V, 0.6–5.0% Nb, 2.0–15%, Mo, 3.0% or below Si, 3.0% or below Mn, C, V, Nb and Cr satisfying a following formula (1):

$$10.5(\%) \leq 6.5 \cdot C(\%) - 1.3 \cdot V(\%) - 0.7 \cdot Nb(\%) \leq 2 \cdot Cr(\%) - 2(\%) \quad (1)$$

with the balance of Fe and incidental impurities;

centrifugally casting graphite steel containing 0.5% or above of C as an intermediate layer; and casting an axis material which is a spheroidal graphite cast iron, a flake graphite cast iron or a graphite steel.

C is present in the intermediate layer in an amount which satisfies a following formula (2):

C (intermediate layer)≧2.0−0.5 (C−0.2 V−0.11 Nb)(outer layer)(2)

Other objects and advantages of the invention will become apparent from the following description taken in connection with the accompanying drawings.

Figure 1:
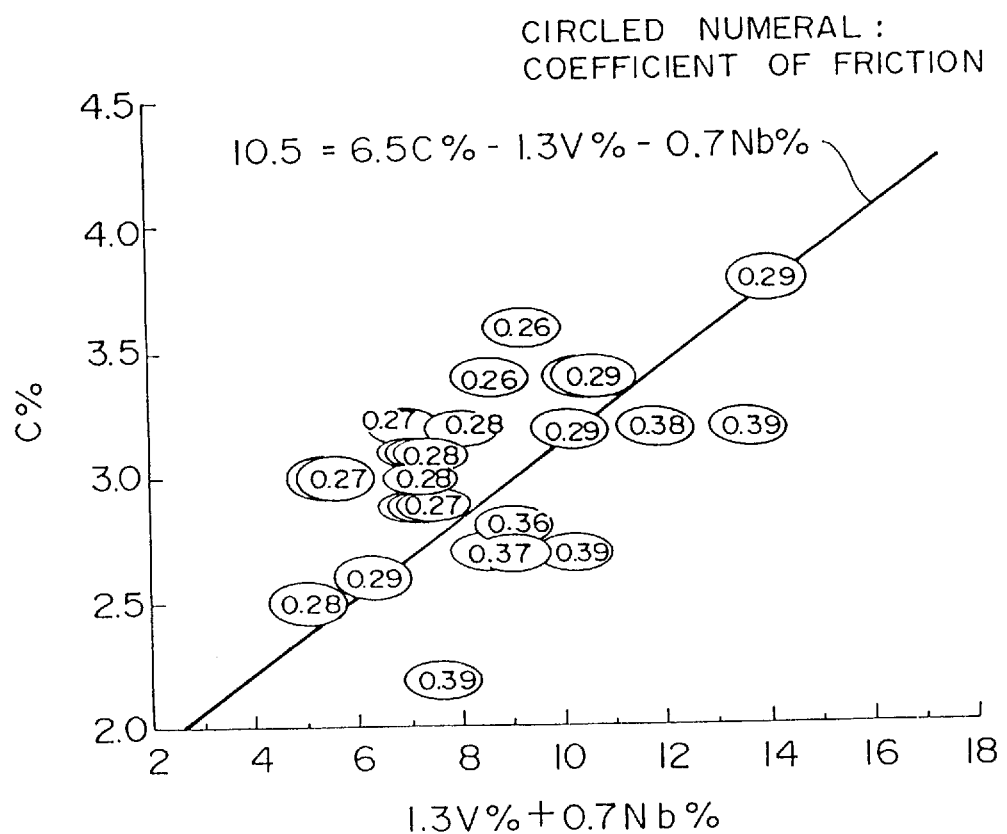
FIG. 1 is a graph illustrating the correlation between the relations between C, V and Nb with the coefficient of friction.

DETAILED DESCRIPTION OF THE PREFERRED EMBODIMENTS (A) Basic concept of the invention First, the basic technical concept of the present invention will be described.

The structure of a high V or high V—Nb roll outer layer material is made up of proeutectic carbides (including V and Nb carbides), eutectic carbides (including Cr, Mo and Fe carbides) and a base. During rolling, the less hard base selectively wears, resulting in projection of the hard proeutectic and eutectic carbides. An increase in the coefficient of friction occurs because the proeutectic carbides act as projections and because shoulders are generated between the matrix which occupies most of the structure and the proeutectic carbides. Hence, the frictional force is reduced to prevent an excessive increase in the rolling load and generation of secondary scale in the surface of a rolled material and to prevent generation of surface roughening of the rolled material either by changing the amount or shape of the proeutectic carbides or by lessening the shoulders between the proeutectic carbides and the portion other than the proeutectic carbides.

It is possible to generate eutectic carbides having the second highest hardness in the structure of the roll outer layer material in which the proeutectic carbides have the highest hardness. Thus, shoulders between the proeutectic carbides and the portion other than the proeutectic carbides can be lessened to reduce the coefficient of friction of the roll outer layer material by increasing eutectic carbides in the structure of the roll outer layer material.

Furthermore, in order to reduce fatigue of the roll surface layer portion and hence restrict banding, the present inventors consider that strengthening of the proeutectic carbides, eutectic carbides and matrix structure is effective. Thus, it is considered that fatigue resistance (banding resistance) can be improved due to strengthening by solid-solution or precipitation by increasing the amounts of adequate alloy elements to be added to the roll.

The roll according to the present invention is particularly suitable for use in a hot rolling stand in a front stage of finishing strip mill. Where there are n stands in a mill, the front stage is a group of rolling stands from the first stand to n/2th stand (or to if n is an odd number). This stage performs rolling at a rolling reduction of 85 to 90% with the thickness of a slab, which does not yet enter the finishing strip mill, and in such a manner that the temperature of the slab at the outlet side of the each stand is between 850° and 900° C.

(B) Composition of the roller outer layer material according to the present invention C: 2.5 to 4.0%

The addition of C is essential to form a hard carbide which is required to improve wear resistance of the roll outer layer material. The presence of less than 2.5% C makes formation of a sufficient amount of carbide impossible, thus reducing wear-resistance of the roll outer layer material while increasing the coefficient of friction thereof which can be a cause of surface roughening. The addition of more than 4.0% C has no significance in terms of the effect of reducing the coefficient of friction and it reduces wear resistance.

The preferred proportion of C is between 2.8 and 3.5%.

Si: 3.0% or below

The addition of an adequate amount of Si assures deoxidation and castability. Since the effect of the addition thereof is saturated if the proportion exceeds 3%, the proportion is limited up to 3%. The preferred range is between 0.1 and 1.5%.

Mn: 3.0 or below

The inclusion of Mn is effective to remove S in the form of MnS and to strengthen the structure. The upper limit of the proportion thereof is 3%, because the effect of the addition of Mn is saturated if the proportion exceeds 3%. The preferred proportion is between 1.0 and 1.2%.

Cr: 6.0 to 20%

Cr forms a tough eutectic carbide and thus the presence thereof is advantageous to improve wear resistance. A solid-solution of Cr in the matrix strengthens the matrix structure and improves fatigue characteristics, and improves adhesion of a oxide layer on the roll. Thus, the introduction of Cr is mandatory. The amount of Cr added is 6.0% or above. However, since the effect of improving wear resistance is saturated when the amount of Cr exceeds 20%, the proportion of Cr is limited up to 20% to prevent deterioration in resistance to sticking.

The preferred proportion is between 8.0 and 20%.

Mo: 2.0 to 15%

Mo forms a carbide, like Cr, and thus the inclusion thereof is advantageous to improve wear resistance. Further, Mo concentrates in the carbide and strengthens the carbide. Mo enhances banding resistance. These effects can be obtained at 2,0% or above Mo. However, since the effects are saturated when the proportion exceeds 15%, the proportion of Mo is limited up to 15%.

Figure 4:
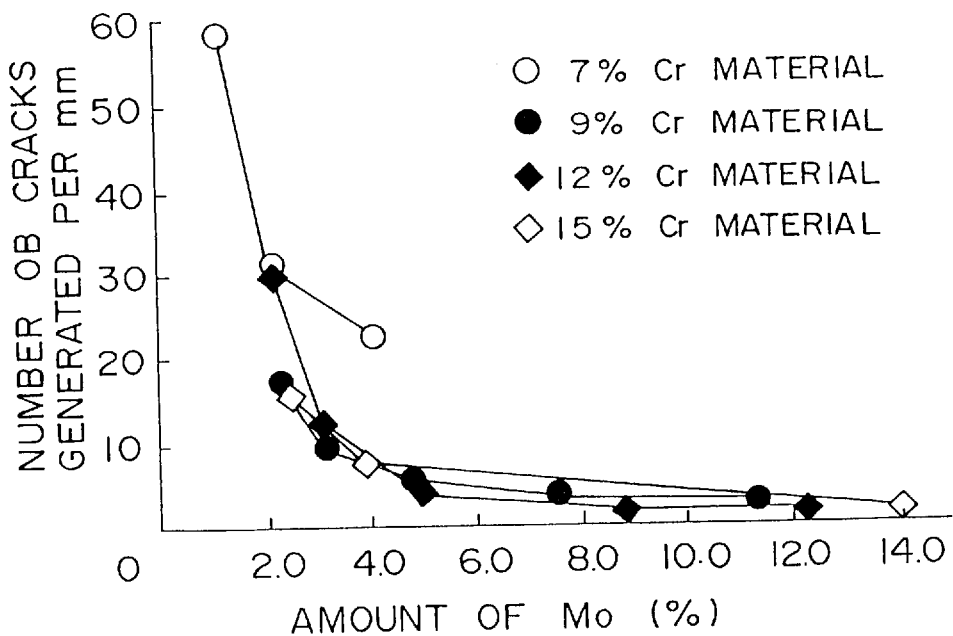
FIG. 4 is a graph illustrating the relation between the number of cracks generated in a carbide due to fatigue and the amounts of Mo and Cr.

FIG. 4 illustrates the relation between the number of fatigue cracks generated in the surface of a sample subjected to the double disk slide-contact rolling fatigue test and the amounts of Mo and Cr. When Mo exceeds 2.0%, the number of cracks is halved. Up to about 15%, as the amount of Mo increases, the number of cracks decreases. Regarding Cr, the effect of the addition of Cr increases, as the proportion of Cr increases.

The preferred proportion of Mo according to the present invention is between 3 and 12%.

Mo/Cr ratio: 0.25 or above

Figure 5:
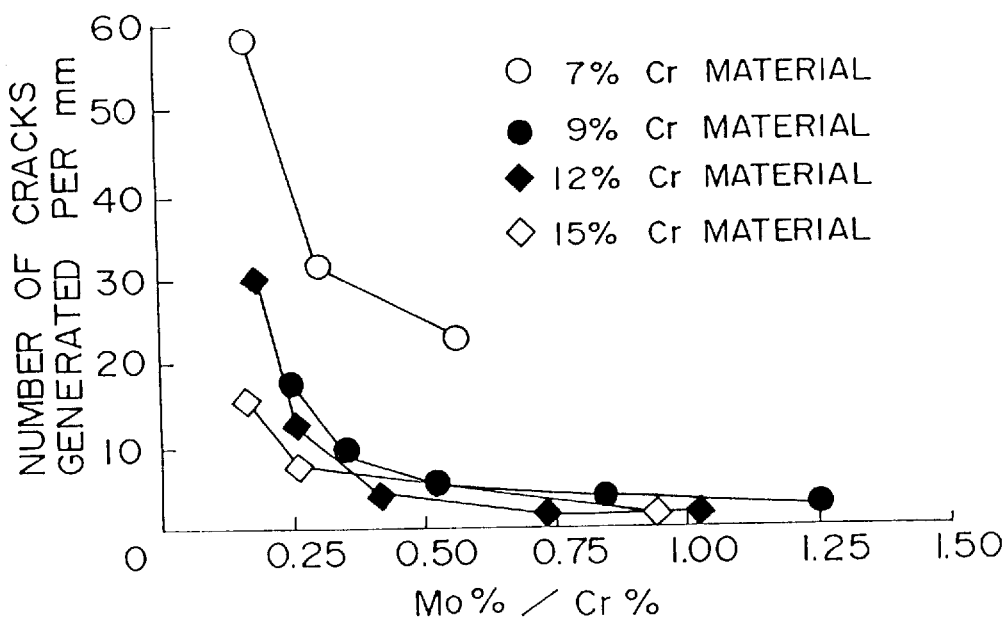
FIG. 5 is a graph illustrating dependency of the generation of cracks on a Mo/Cr ratio.

There is a preferred range for Mo/Cr ratio from the viewpoint of banding resistance. FIG. 5 shows the rearranged results shown in FIG. 4 with the Mo/Cr ratio as the abscissa.

As can be seen from FIG. 5, when Mo/Cr ratio is 0.25 or above, the number of cracks generated greatly decreases. The number of cracks is minimized when Mo/Cr ratio is between 0.3 and 1.0. Thus, in order to prevent banding, Mo/Cr ratio is set to 0.25 or above with a preferred range being between 0.3 and 1.0.

Ni: 1.0% or below

The addition of Ni improves hardenability and thus expands the operation range for quenching. The addition of Ni is more effective for rolls having a large roll diameter. Thus, Ni is added when necessary. Since the presence of more than 1.0% Ni forms an unstable structure in which, for example, residual γ is present, it is limited up to 1.0%.

W: 1.0% or below

In the present invention, the inclusion of W, which bonds with C to form a hard carbide, has no effect of improving wear resistance and surface roughening inhibiting property of the roll (of reducing the coefficient of friction). Further, the presence of more than 1.0% W promotes segregation of carbides (further promotes segregation during centrifugal casting), and deteriorates wear resistance and surface roughening resistance. Thus, the inclusion of W is not generally necessary in the invention. If W is added, however, depending on the conditions under which the roll is used, the preferred W proportion must be 1.0% or below.

Co: 5% or below

Since the presence of Co stabilizes the structure at high temperatures, Co is added if necessary. However, the effect of Co addition in terms of the improvement of wear resistance and surface roughening inhibiting property of the roll is not apparent. The preferred proportion of Co is limited up to 5% from the economical viewpoint.

V: 3.0 to 10.0%, Nb: 0.6 to 5.0%

V is essential to form a hard MC or $M_4C_3$ carbide which is the most effective substance to improve wear resistance. The effect of V addition can be discerned at 3.0% or above. The presence of more than 10.0% has no effect and causes a problem during casting, such as a making micro cavity. Thus, the presence of V is limited up to 10.0%. The preferred proportion is between 4.0 and 7.0%.

Like V, Nb forms an MC carbide which is the effective substance to improve wear resistance. Further, Nb restricts segregation of a V carbide, and thus enables the provision of an outer layer in which the MC carbide is uniformly dispersed even if the centrifugal casting process is used to manufacture a roll. The effect of Nb addition can be discerned at 0.6% or above. The presence of up to 5.0% has no effect and causes a problem during casting, such as a making micro cavity. Thus, the presence of Nb is limited up to 5.0%. Further, the addition of Nb or V alone forms a rough bulk carbide or a dendritic carbide, and thus greatly deteriorates wear resistance. Thus, Nb must be added together with V.

The preferred proportion of Nb is between 1.0 and 3.0%.

Parameter: $10.5(\%) \leq 6.5.C(\%)-1.3.V(\%)-0.7.Nb(\%) \leq 2.Cr(\%)-2(\%)$

The present invention is characterized in that the composition of a roll exhibiting excellent wear resistance and surface roughening inhibiting property satisfies the above-described formula. In a high V—Nb roll, whereas formation of hard V (Nb) C greatly improves the wear resistance of the roll, it increases the coefficient of friction, thus generating surface roughening of the plates. Hence, the present inventors had the following formula which calculated the amount of C consumed by both V and Nb as follows:

$$(6.5.C(\%)-1.3.V(\%)-0.7.Nb(\%)),$$

studied the relation between the amounts of V and Nb and the total amount of C added, and correlated the coefficient of friction with the resultant relation. The results are shown in FIG. 1. That is, the present inventors found that a high V—Nb type composition must satisfy the formula $(10.5(\%) \leq 6.5.C(\%)-1.3.V(\%)0.7.Nb(\%))$ in order to obtain a coefficient of friction (about 0.28) similar to that of a high Cr cast iron suitable for use as a hot rolling stand in a front-stage of finishing strip mill.

Figure 2:
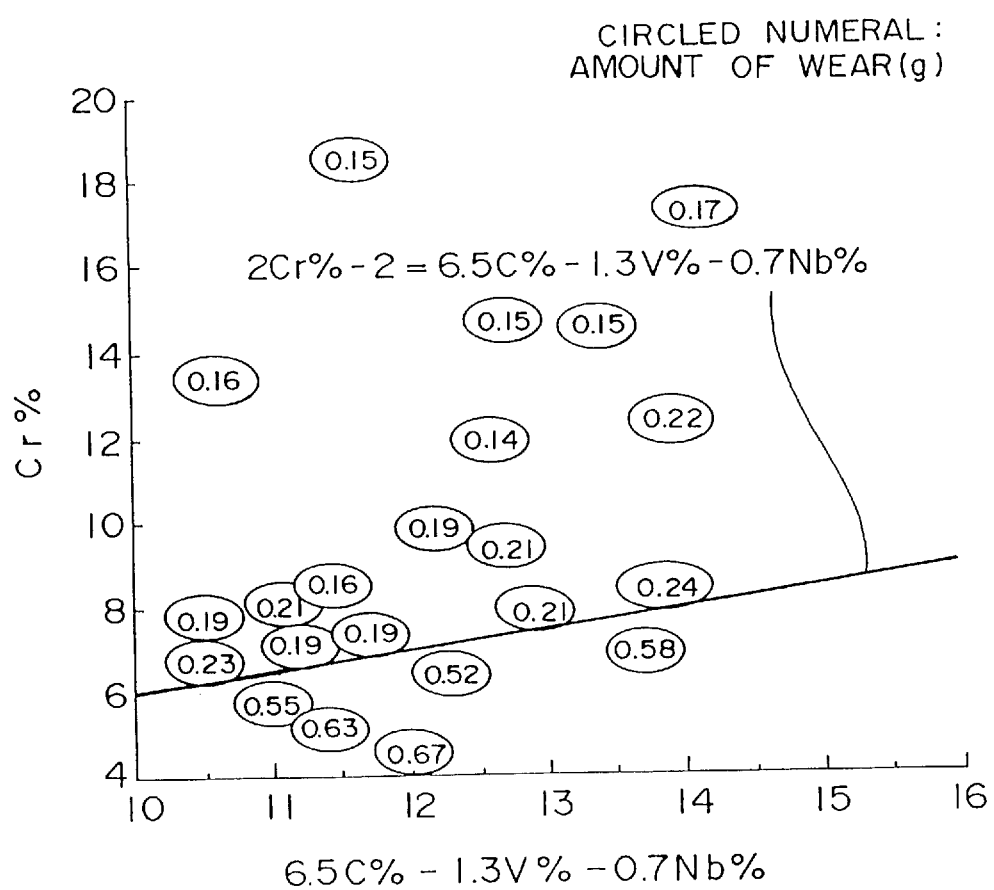
FIG. 2 is a graph illustrating the correlation between C, V, Nb and Cr with the amount of wear.

It was observed that in a composition which satisfies the above-described formula, a reduction in the amount of Cr greatly deteriorated wear resistance and fatigue resistance. The present inventors hypothesize that in a composition which satisfies the above formula in which large amounts of eutectic carbides are present, a reduction in the amount of Cr reduces the amount of Cr distributed into the eutectic carbides, thus lowering wear resistance. Thus, the present inventors studied the relation between $6.5.C(\%)-1.3.V(\%)-0.7.Nb(\%))$ and the amount of Cr, and correlated the amount of wear and the resultant relation. The results are shown in FIG. 2. That is, it is apparent that the composition, which satisfies $10.5(\%) \leq 6.5.C(\%)-1.3.V(\%)-0.7.Nb(\%)$ and thus has a low coefficient of friction, must satisfy $6.5.C(\%)-1.3.V(\%)-0.7.Nb(\%) \leq 2.Cr(\%)-2(\%)$ to provide a roll exhibiting excellent wear resistance.

It is thus apparent that in a high V—Nb roll exhibiting excellent wear resistance and surface roughening inhibiting property, a composition must satisfy $10.5(\%) \leq 6.5.C(\%)-1.3.V(\%)-0.7.Nb(\%) \leq 2.Cr(\%)-2(\%)$.

The results shown in FIGS. 1, 2 and 4 are based on the examples.

(C) The reason why the amount of Cr in the intermediate layer is limited in the present invention when the intermediate layer is formed by casting will be described below.

In a composite three-layer roll, the boundary portion between the outer layer and the intermediate layer and the boundary portion between the intermediate layer and the inner layer are metallurgically joined. A defect, such as internal shrinkage, must not be present in any of these boundary portions. The present inventors inspected the presence or absence of a boundary defect, which could be inspected during manufacture from the surface of the roll by ultrasonic flaw detection, of a broken roll and of a unbroken abolished roll by cutting the roll. They found that internal shrinkage was present in the boundary portion of the broken roll between the outer layer and the intermediate layer.

The mechanism of generation of internal shrinkage in the boundary portion is as follows:

In centrifugal casting, a molten metal forming the outer layer is first poured into a cooled metal mold. Solidification starts from the outer side of the molten metal which is contact with the metal mold. After the entire molten metal is solidified, a molten metal forming the intermediate layer is poured. The poured molten metal forming the intermediate layer melts the inner side of the outer layer again. Thereafter, the melted outer layer and the intermediate layer (in which the outer layer component is present as the result of remelting) are solidified by cooling through the metal mold and outer layer. At that time, if the melting point of the outer layer is higher than or equal to the melting point of the intermediate layer, solidification apparently starts from the outer side which is close to the mold and proceeds inwardly. If the melting point of the outer layer is lower than the melting point of the intermediate layer, the intermediate layer first solidifies, and then the boundary portion between the outer layer and the intermediate layer solidifies. At that time, internal shrinkage may be generated depending on the shrinkage rate of the outer layer.

The present inventors centrifugally cast (140 G) an outer layer first and then an intermediate layer, and finally stationarily cast the axis material (the inner layer a spheroidal graphite cast iron), and inspected the presence or absence of a boundary defect between the inner layer and the intermediate layer by conducting ultrasonic flaw detection tests on the outer layer and the intermediate portion from the outer surface of the roll. It can be seen from FIG. 3 that the range which does not substantially generate a boundary detect is determined by $$C \text{ (intermediate layer)} \leq 2.0 - 0.5(C - 0.2 V - 0.11 Nb) \text{ (outer layer)} \quad (2)$$

C concentration of the intermediate layer in the formula (2) is the value obtained during casting, and does not include the amount of C contained in the intermediate layer as the result of remelting of the outer layer. C, V and Nb concentrations of the outer layer in the formula (2) are those obtained during casting and are equivalent to those of the manufactured outer layer.

Figure 3:
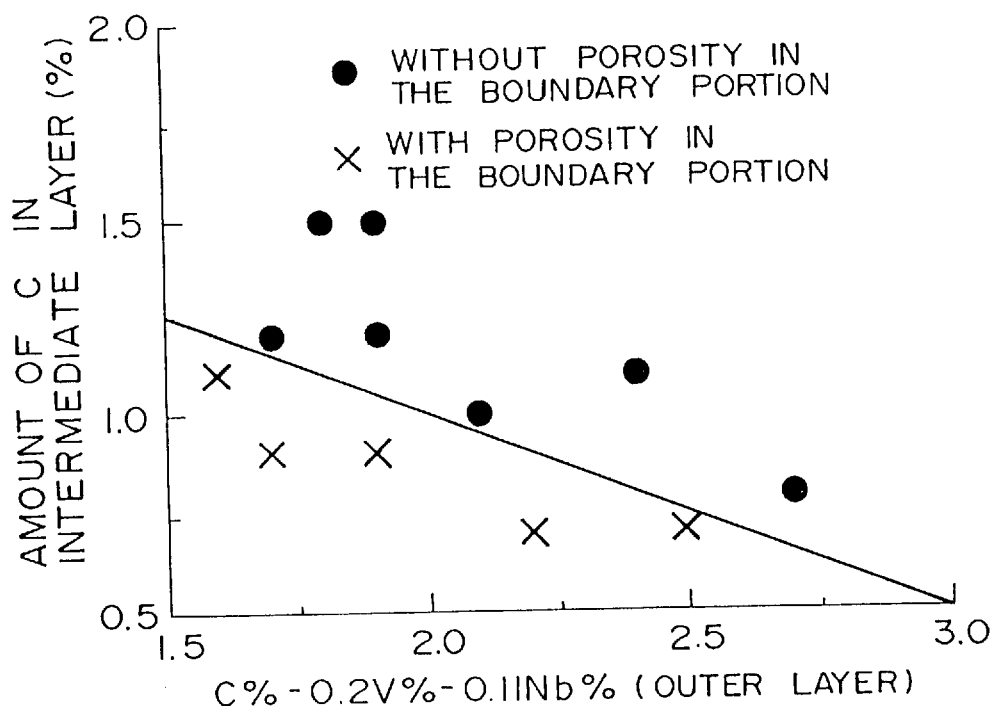
FIG. 3 illustrates dependency of the generation of a boundary defect on the amount of C in an intermediate layer during casting.

In FIG. 3, the presence or absence of porosity in the boundary portion is determined by obtaining a ultrasonic flaw detection index from the results of the ultrasonic flaw detection test on the boundary portion between the outer layer and the intermediate layer in the manner described below. The ultrasonic flaw detection index is a product of the total defective area obtained by ultrasonic flaw detection and the reflection echo peak rate of a standard defective sample. A reflection echo peak rate 0.2 or above is regarded as "boundary portion porosity is present". This is because when a ultrasonic flaw detection test is conducted on the boundary portion between the outer layer and the intermediate layer of the roll, even if the boundary portion is not defective at all, a reflection echo of about 0.15 is obtained due to a difference in the structure between the outer layer and the intermediate layer.

The standard defective sample from which the reflection echo peak rate was obtained was made of a material having a composition which consisted of 4.2% C, 0.5% Si, 0.5% Mn, 7.2% Cr, 3.1% Mo, 6.0% V and 2.2% Nb. The sample had a thickness of 100 mm. A defect of 2 mm was formed at a position of 50 mm in the direction of the thickness of the sample.

A desirable amount of C in the intermediate layer is 0.5% or above, although it is restricted by the above-described formula. Less than 0.5% C increases the viscosity of the molten metal, making it impossible for the molten metal to be uniformly distributed in the mold during centrifugal casting. Accordingly, variations in the amount of melted outer layer become too great, making the use of a resulting roll impossible.

EXAMPLES

Example 1

Samples equivalent to roll outer layer materials and having chemical compositions shown in Table 1 were each melted, and quenched at temperatures which started from 1000° C. and then were tempered at 550° C. to manufacture sample materials. Wearing test was two-disk sliding friction type which employed a sample material of φ50×10 and the other material of φ190×15. The test was conducted by rotating the sample material at 800 rpm in a state wherein it was pressed against the other material heated to 900° C. under a load of 100 kgf while the sample material was water cooled. In order to increase the surface damage of the sample material and to enable relative evaluation of the coefficient of friction, the wear test was conducted for 120 minutes at a sliding rate of 14.2% to examine the amount of wear and the average coefficient of friction.

The results of the wear test are shown in Table 2.

Samples B-1 to B-8 which do not satisfy the formula $$10.5(\%) \leq 6.5.C(\%) - 1.3.V(\%) - 0.7.Nb(\%)$$

have coefficients of friction which are about 30% higher than that of a high Cr cast iron. If such a material is used for a hot rolling roll, a rolling load is increased, thus causing surface roughening of the plate.

Samples D-1 to D-5 which do not satisfy the formula $$6.5.C(\%) - 1.3.V(\%) - 0.7.Nb(\%) \leq 2.Cr(\%) - 2(\%)$$

exhibit greatly deteriorated wear resistance. In contrast to these comparative examples, the examples according to the present invention have coefficients of friction which are similar to that of a high Cr cast iron, and wear resistances which are 7 times that of a high Cr cast iron.

Samples C-1 and C-2 are comparative examples in which W is not present in the determined amount, and sample C-3 is a comparative example in which Nb is not present in the determined amount. It is apparent from Table 2 that wear resistance of these comparative examples is greatly reduced.

That is, it is possible according to the present invention to provide a roll outer layer material for hot rolling suitable for use in hot rolling finish front stage which exhibits excellent wear resistance and a low coefficient of friction and an hence excellent surface roughening inhibiting property by optimizing the composition of the outer layer material and by mutually restricting the amounts of C, Cr, V and Nb.

TABLE 1-1

| | (Example of the invention) | | | | | | | | | | | |
|---|---|---|---|---|---|---|---|---|---|---|---|---|
| | C | Si | Mn | P | S | Mo | Cr | V | Nb | W | Co | Ni |
| A1 | 2.5 | 0.9 | 0.5 | 0.03 | 0.01 | 4.2 | 8.1 | 3.5 | 0.8 | — | — | — |
| A2 | 2.6 | 0.5 | 0.4 | 0.03 | 0.01 | 3.8 | 6.5 | 4.3 | 1.1 | — | — | — |
| A3 | 2.9 | 0.3 | 0.5 | 0.01 | 0.01 | 5.2 | 7.0 | 5.1 | 1.4 | — | — | — |

TABLE 1-1-continued (Example of the invention)

|     | C   | Si  | Mn  | P    | S    | Mo   | Cr   | V   | Nb  | W   | Co  | Ni  |
|-----|-----|-----|-----|------|------|------|------|-----|-----|-----|-----|-----|
| A4  | 3.0 | 0.4 | 0.6 | 0.01 | 0.01 | 2.4  | 8.3  | 3.6 | 1.0 | —   | —   | —   |
| A5  | 3.0 | 0.5 | 0.5 | 0.03 | 0.03 | 2.5  | 8.4  | 3.5 | 1.1 | —   | —   | 0.8 |
| A6  | 3.0 | 0.3 | 1.1 | 0.03 | 0.02 | 6.9  | 12.4 | 3.7 | 1.2 | —   | —   | —   |
| A7  | 3.0 | 0.6 | 0.3 | 0.02 | 0.01 | 5.1  | 9.9  | 4.9 | 1.4 | —   | —   | —   |
| A8  | 3.1 | 0.3 | 0.3 | 0.02 | 0.01 | 7.4  | 8.0  | 4.4 | 2.2 | —   | —   | —   |
| A9  | 3.2 | 1.0 | 0.3 | 0.03 | 0.01 | 3.6  | 8.4  | 4.9 | 0.9 | —   | —   | —   |
| A10 | 3.2 | 0.9 | 0.9 | 0.04 | 0.01 | 4.5  | 9.5  | 4.2 | 3.8 | —   | —   | —   |
| A11 | 3.2 | 1.2 | 0.9 | 0.03 | 0.01 | 7.8  | 7.8  | 6.6 | 2.4 | —   | —   | —   |
| A12 | 3.4 | 0.7 | 0.5 | 0.03 | 0.01 | 6.5  | 7.2  | 6.8 | 2.3 | —   | —   | —   |
| A13 | 2.9 | 0.3 | 0.4 | 0.05 | 0.03 | 3.5  | 8.5  | 5.0 | 1.4 | —   | —   | —   |
| A14 | 2.9 | 0.4 | 0.4 | 0.06 | 0.03 | 3.6  | 8.5  | 5.1 | 1.5 | 0.6 | —   | —   |
| A15 | 3.0 | 0.3 | 0.4 | 0.04 | 0.03 | 3.6  | 8.5  | 5.0 | 1.5 | —   | 3.8 | —   |
| A16 | 2.9 | 0.4 | 0.4 | 0.02 | 0.01 | 7.4  | 18.6 | 4.8 | 1.4 | —   | —   | —   |
| A17 | 3.0 | 0.3 | 0.3 | 0.05 | 0.04 | 7.5  | 18.5 | 4.9 | 1.5 | 0.5 | 4.0 | —   |
| A18 | 3.1 | 0.4 | 0.5 | 0.02 | 0.01 | 4.4  | 14.8 | 5.0 | 1.4 | —   | —   | —   |
| A19 | 3.1 | 0.3 | 0.4 | 0.01 | 0.01 | 4.2  | 12.0 | 5.0 | 1.5 | —   | —   | —   |
| A20 | 3.8 | 1.1 | 0.6 | 0.03 | 0.02 | 5.3  | 13.4 | 9.1 | 3.2 | —   | —   | —   |
| A21 | 3.6 | 0.5 | 0.3 | 0.02 | 0.01 | 11.2 | 17.3 | 6.2 | 1.8 | —   | —   | —   |
| A22 | 3.4 | 0.3 | 0.2 | 0.01 | 0.01 | 8.2  | 14.6 | 5.8 | 1.6 | —   | —   | —   |

TABLE 1-2

(Comparative example)

|     | C    | Si   | Mn   | P    | S    | Mo   | Cr   | V   | Nb  | W   | Co  | Ni  |
|-----|------|------|------|------|------|------|------|-----|-----|-----|-----|-----|
| B1  | 2.2  | 0.6  | 0.5  | 0.03 | 0.01 | 3.0  | 5.7  | 5.1 | 1.5 | —   | —   | —   |
| B2  | 2.7  | 0.6  | 0.5  | 0.03 | 0.01 | 4.6  | 7.2  | 7.0 | 1.8 | —   | —   | —   |
| B3  | 2.7  | 0.5  | 0.6  | 0.03 | 0.01 | 2.8  | 4.1  | 5.5 | 2.0 | —   | —   | —   |
| B4  | 2.7  | 0.6  | 0.4  | 0.03 | 0.02 | 4.0  | 7.8  | 5.6 | 1.5 | —   | —   | —   |
| B5  | 2.8  | 1.5  | 0.3  | 0.03 | 0.02 | 2.6  | 6.0  | 5.9 | 1.6 | —   | —   | —   |
| B6  | 3.2  | 0.3  | 0.3  | 0.04 | 0.02 | 7.1  | 7.8  | 8.0 | 2.1 | —   | —   | —   |
| B7  | 3.2  | 0.3  | 1.1  | 0.03 | 0.02 | 6.8  | 6.2  | 8.1 | 4.5 | —   | —   | —   |
| B8  | 2.7  | 0.5  | 0.6  | 0.04 | 0.03 | 2.4  | 13.1 | 6.1 | 1.8 | —   | —   | —   |
| C1  | 3.1  | 0.3  | 0.4  | 0.01 | 0.01 | 4.5  | 12.5 | 5.2 | 1.4 | 3.6 | —   | —   |
| C2  | 2.9  | 0.3  | 0.4  | 0.04 | 0.02 | 3.6  | 8.6  | 5.0 | 1.4 | 1.9 | —   | —   |
| C3  | 3.0  | 0.3  | 0.3  | 0.05 | 0.03 | 3.5  | 8.5  | 5.2 | 0.2 | —   | —   | —   |
| D1  | 2.9  | 1.2  | 0.6  | 0.03 | 0.01 | 3.1  | 5.1  | 4.9 | 1.5 | —   | —   | —   |
| D2  | 3.0  | 0.8  | 0.4  | 0.03 | 0.01 | 2.3  | 6.6  | 4.8 | 1.4 | —   | —   | —   |
| D3  | 2.9  | 0.4  | 0.5  | 0.04 | 0.03 | 3.2  | 4.5  | 4.8 | 0.9 | —   | —   | —   |
| D4  | 3.2  | 1.3  | 0.4  | 0.03 | 0.01 | 1.9  | 6.9  | 5.0 | 0.8 | —   | —   | —   |
| D5  | 3.8  | 1.1  | 1.1  | 0.04 | 0.01 | 3.0  | 5.7  | 8.1 | 4.6 | —   | —   | —   |
| E (High Cr cast iron) | 2.80 | 0.60 | 0.80 | 0.03 | 0.01 | 2.60 | 17.8 | —   | —   | —   | —   | —   |

TABLE 2-1

(Example of the invention)

|     | 6.5 C-1.3 V-0.7 Nb | 2 Cr-2 | Amount of wear (g) | Coefficient of friction |
|-----|--------------------|--------|---------------------|--------------------------|
| A1  | 11.1 | 14.2 | 0.21 | 0.28 |
| A2  | 10.5 | 11.0 | 0.23 | 0.29 |
| A3  | 11.2 | 12.0 | 0.19 | 0.28 |
| A4  | 14.1 | 14.6 | 0.24 | 0.27 |
| A5  | 14.2 | 14.8 | 0.24 | 0.27 |
| A6  | 13.9 | 22.8 | 0.23 | 0.27 |
| A7  | 12.2 | 17.8 | 0.19 | 0.28 |
| A8  | 12.9 | 14.0 | 0.21 | 0.28 |
| A9  | 13.8 | 14.8 | 0.23 | 0.27 |
| A10 | 12.7 | 17.0 | 0.21 | 0.28 |
| A11 | 10.5 | 13.6 | 0.19 | 0.29 |
| A12 | 11.7 | 12.4 | 0.19 | 0.29 |
| A13 | 11.4 | 15.0 | 0.16 | 0.27 |
| A14 | 11.2 | 15.0 | 0.23 | 0.29 |
| A15 | 12.0 | 15.0 | 0.16 | 0.27 |
| A16 | 11.6 | 35.2 | 0.15 | 0.26 |
| A17 | 12.1 | 35.0 | 0.15 | 0.27 |
| A18 | 12.7 | 27.6 | 0.15 | 0.26 |
| A19 | 12.6 | 22.0 | 0.14 | 0.26 |
| A20 | 10.6 | 24.8 | 0.16 | 0.29 |

TABLE 2-1-continued (Example of the invention)

| | 6.5 C-1.3 V-0.7 Nb | 2 Cr-2 | Amount of wear (g) | Coefficient of friction |
|---|---|---|---|---|
| A21 | 14.1 | 32.6 | 0.17 | 0.26 |
| A22 | 13.4 | 27.2 | 0.15 | 0.26 |

TABLE 2-2

(Comparative example)

| | 6.5 C-1.3 V-0.7 Nb | 2 Cr-2 | Amount of wear (g) | Coefficient of friction |
|---|---|---|---|---|
| B1 | 6.6 | 9.4 | 0.19 | 0.39 |
| B2 | 7.2 | 12.4 | 0.18 | 0.39 |
| B3 | 9.0 | 6.2 | 0.52 | 0.37 |
| B4 | 9.2 | 13.6 | 0.24 | 0.36 |
| B5 | 9.4 | 10.0 | 0.39 | 0.36 |
| B6 | 8.9 | 13.6 | 0.22 | 0.38 |
| B7 | 7.1 | 10.4 | 0.19 | 0.39 |
| B8 | 8.4 | 24.2 | 0.48 | 0.37 |
| C1 | 12.4 | 23.0 | 0.62 | 0.31 |
| C2 | 11.4 | 15.2 | 0.50 | 0.28 |
| C3 | 12.6 | 15.0 | 0.54 | 0.27 |
| D1 | 11.4 | 8.2 | 0.63 | 0.28 |
| D2 | 12.3 | 11.2 | 0.52 | 0.28 |
| D3 | 12.0 | 7.0 | 0.67 | 0.28 |
| D4 | 13.7 | 11.8 | 0.58 | 0.27 |
| D5 | 11.0 | 9.4 | 0.55 | 0.29 |
| E (High Cr cast iron) | 18.2 | 33.6 | 1.62 | 0.28 |

Example 2

Composite rolls, having a diameter of 800 mm and a length of 2400 mm, were each manufactured by centrifugally casting (140 G) first an outer layer material (having a thickness of 100 mm) and then an intermediate layer material (having a thickness of 40 mm), and then by static casting an inner layer material. Table 3 shows the compositions of the outer layers and intermediate layers. The inner layer material of each of the composite rolls was a spheroidal graphite cast iron. Table 4 shows the boundary portion porosity index of each roll. Samples G-1 to G-6 are comparative examples which do not satisfy the formula (2).

$$C \text{ (intermediate layer)} \geq 2.0 - 0.5(C - 0.2 \text{ V} - 0.11 \text{ Nb}) \text{ (outer layer)} \quad (2)$$

In these comparative examples having high ultrasonic flaw detection detect indexes, D2 and D5 rolls were broken during manufacture and G2 to G5 rolls were broken during heat treatment. Thus, the use of G-1 to G-5 rolls was suspended because there was the possibility that an accident would occur during rolling.

The results of the inspection of internal porosity are shown in FIG. 3. It was found that when the amount of C in the intermediate layer was a value determined by $$C \geq 2.0 - 0.5(C - 0.2 \text{ V} - 0.11 \text{ Nb})$$

(components of the outer layer material), a roll for hot rolling having no internal defect could be manufactured.

TABLE 3-1

(Example of the invention)

| | | C | Si | Mn | Mo | Cr | V | Nb | Co | W |
|---|---|---|---|---|---|---|---|---|---|---|
| F1 | Outer Layer | 2.6 | 0.9 | 0.5 | 4.0 | 8.5 | 3.3 | 0.7 | — | — |
| | Intermediate Layer | 1.2 | 1.5 | 0.6 | — | — | — | — | — | — |
| F2 | Outer Layer | 2.6 | 0.6 | 0.5 | 4.2 | 6.8 | 4.3 | 0.8 | — | — |
| | Intermediate Layer | 1.2 | 1.6 | 0.6 | — | — | — | — | — | — |
| F3 | Outer Layer | 3.0 | 0.3 | 0.3 | 3.5 | 8.3 | 4.8 | 1.4 | — | — |
| | Intermediate Layer | 1.5 | 2.0 | 0.8 | — | — | — | — | — | — |
| F4 | Outer Layer | 3.0 | 0.3 | 1.1 | 5.1 | 12.2 | 5.1 | 1.6 | — | — |
| | Intermediate Layer | 1.5 | 1.5 | 0.5 | — | — | — | — | — | — |
| F5 | Outer Layer | 3.1 | 0.6 | 0.3 | 5.1 | 9.9 | 3.3 | 0.8 | — | — |
| | Intermediate Layer | 1.1 | 1.6 | 0.6 | — | — | — | — | — | — |
| F6 | Outer Layer | 3.4 | 0.3 | 0.3 | 7.4 | 10.1 | 5.5 | 2.2 | — | — |
| | Intermediate Layer | 1.0 | 1.4 | 0.7 | — | — | — | — | — | — |
| F7 | Outer Layer | 3.5 | 1.0 | 0.7 | 7.6 | 10.5 | 3.6 | 1.1 | 3.1 | 0.4 |
| | Intermediate Layer | 0.8 | 1.5 | 0.5 | — | — | — | — | — | — |

TABLE 3-2

(Comparative example)

| | | C | Si | Mn | Mo | Cr | V | Nb | Co | W |
|---|---|---|---|---|---|---|---|---|---|---|
| G1 | Outer Layer | 2.7 | 0.6 | 0.5 | 4.1 | 8.5 | 3.4 | 0.9 | — | — |
| | Intermediate Layer | 0.9 | 1.5 | 0.6 | — | — | — | — | — | — |
| G2 | Outer Layer | 2.6 | 0.5 | 0.6 | 4.2 | 6.6 | 4.5 | 0.9 | — | — |
| | Intermediate Layer | 1.1 | 1.6 | 0.6 | — | — | — | — | — | — |
| G3 | Outer Layer | 2.8 | 0.3 | 0.3 | 5.1 | 8.5 | 4.9 | 1.4 | — | — |
| | Intermediate Layer | 0.9 | 1.4 | 0.7 | — | — | — | — | — | — |
| G4 | Outer Layer | 3.1 | 0.8 | 0.4 | 5.1 | 10.0 | 4.3 | 0.7 | — | — |
| | Intermediate Layer | 0.7 | 1.5 | 0.5 | — | — | — | — | — | — |
| G5 | Outer Layer | 3.8 | 1.3 | 0.4 | 7.5 | 10.2 | 5.3 | 2.3 | — | — |
| | Intermediate Layer | 0.7 | 1.6 | 0.6 | — | — | — | — | — | — |
| G6 | Outer Layer | 2.2 | 0.3 | 0.3 | 2.5 | 6.2 | 5.3 | 1.6 | — | — |
| | Intermediate Layer | 1.4 | 2.0 | 0.8 | — | — | — | — | — | — |

TABLE 4

| | C % in intermediate Layer | 2-0.5 (C-0.2 V-0.11 Nb) | Boundary Layer porosity index | |
|---|---|---|---|---|
| F1 | 1.2 | 1.07 (outer layer) | 0 | Example of the |
| F2 | 1.2 | 1.17 (outer layer) | 0.1 | invention |
| F3 | 1.5 | 1.06 (outer layer) | 0 | |
| F4 | 1.5 | 1.10 (outer layer) | 0 | |
| F5 | 1.1 | 0.82 (outer layer) | 0 | |
| F6 | 1.0 | 0.97 (outer layer) | 0 | |
| F7 | 0.8 | 0.67 (outer layer) | 0 | |
| G1 | 0.9 | 1.04 (outer layer) | 64 | Comparative |
| G2 | 1.1 | 1.20 (outer layer) | 49 | Example |
| G3 | 0.9 | 1.17 (outer layer) | 138 | |
| G4 | 0.7 | 0.92 (outer layer) | 57 | |
| G5 | 0.7 | 0.76 (outer layer) | 18 | |
| G5 | 1.4 | 1.52 (outer layer) | 6 | |

Example 3

Samples equivalent to roll outer layer materials and having chemical compositions shown in Table 5 were made by melting and casting, and quenched at temperatures which started from 1000° C. and were then tempered at 550° C. to manufacture sample materials. A two-disk sliding friction test, which employed a sample material of φ50×10 and the other material of φ190×15, was conducted at a sliding rate of 14.2% for 200 minutes by rotating the sample at 800 rpm in a state wherein it was pressed against the other material heated at 800° C. under a pressure of 130 kg while the sample was water cooled. The surface of each of the samples subjected to the test was SEM observed to examine the number of cracks generated in the carbide.

The relationships between the number of cracks generated and the amounts of Mo and Cr are shown in FIG. 4. The number of cracks generated is reduced by half at 2% or above of Mo. Up to about 15% of Mo, the more the amount of Mo, the less the number of cracks generated. The number of cracks generated in a 9% Cr material is less than that in a 7% Cr material. Thus, the effect of Cr addition is discerned.

Cracks in the carbide are generated by synergism of rolling and heat fatigue and sliding stress during the test. Thus, the results obtained by the experiments are a simulation of the fatigue which will occur in the roll surface in an actual rolling, and thus clarify that the materials according to the present invention exhibit excellent banding resistance.

TABLE 5

| | C | Si | Mn | Cr | Mo | V | Nb | Mo/Cr | |
|---|---|---|---|---|---|---|---|---|---|
| 7% Cr | 2.9 | 0.3 | 0.3 | 7.1 | 1.2 | 5.9 | 2.0 | 0.17 | Comparative Example |
| material | 3.0 | 0.3 | 0.3 | 7.2 | 2.2 | 5.8 | 2.2 | 0.31 | Example of the |
| | 2.9 | 0.4 | 0.3 | 7.2 | 4.1 | 6.1 | 2.1 | 0.57 | invention |
| 9% Cr | 3.0 | 0.3 | 0.4 | 9.2 | 2.3 | 6.0 | 2.0 | 0.25 | |
| material | 3.1 | 0.4 | 0.3 | 9.1 | 3.2 | 6.0 | 2.0 | 0.35 | |
| | 3.1 | 0.3 | 0.3 | 9.1 | 4.8 | 6.1 | 2.1 | 0.53 | |
| | 3.2 | 0.4 | 0.3 | 9.0 | 7.6 | 6.0 | 2.1 | 0.84 | |
| | 2.9 | 0.4 | 0.4 | 9.1 | 1.4 | 6.2 | 2.0 | 1.25 | |
| 12% Cr | 3.2 | 0.4 | 0.2 | 12.1 | 2.2 | 5.9 | 2.0 | 0.18 | |
| material | 3.2 | 0.4 | 0.2 | 12.0 | 3.1 | 5.8 | 2.2 | 0.26 | |
| | 3.1 | 0.3 | 0.3 | 12.0 | 5.0 | 6.1 | 2.1 | 0.42 | |

TABLE 5-continued

|  | C | Si | Mn | Cr | Mo | V | Nb | Mo/Cr |
|---|---|---|---|---|---|---|---|---|
|  | 3.2 | 0.4 | 0.3 | 12.1 | 8.9 | 6.0 | 2.0 | 0.74 |
|  | 3.1 | 0.4 | 0.2 | 12.0 | 12.3 | 6.0 | 2.0 | 1.03 |
| 15% Cr | 3.2 | 0.3 | 0.4 | 15.0 | 2.5 | 6.1 | 2.1 | 0.17 |
| material | 3.2 | 0.4 | 0.3 | 14.9 | 3.9 | 6.0 | 2.1 | 0.26 |
|  | 3.3 | 0.3 | 0.3 | 15.0 | 14.1 | 6.2 | 2.0 | 0.94 |

Example 4

In the composite rolls shown in Table 3, heat treatment consisting of quenching which started from 1050° C. and hardening at 550° C. was conducted on examples F3 and F4 according to the present invention and comparative example G6. Each of the rolls obtained was used in the second stand in an actual hot strip mill.

Figure 6:
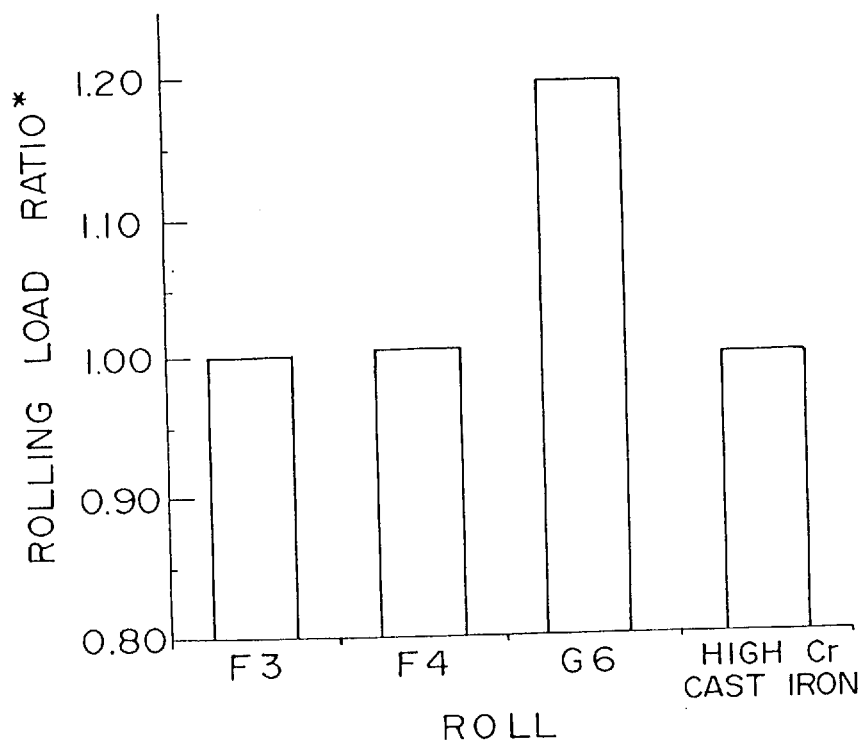
FIG. 6 is a graph illustrating comparison between a roll according to the present invention and a conventional roll in terms of the rolling load.
Figure 7:
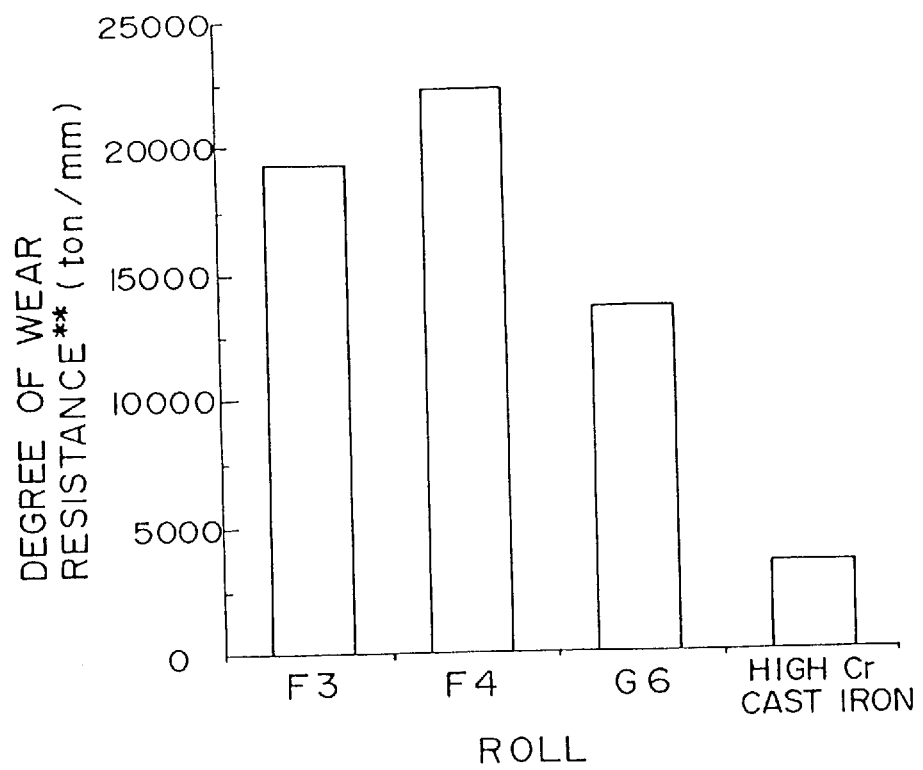
FIG. 7 is a graph illustrating comparison between a roll according to the present invention and a conventional roll in terms of the degree of wear resistance.

It was observed in actual rolling that the rolling load of examples F3 and F4 according to the present invention was equivalent to that of a high Cr cast iron of a conventional roll, as shown in FIG. 6, and that wear-resistance of the examples according to the present invention was at least 6 times that of a high Cr cast iron, as shown in FIG. 7.

Comparative example G6 involves a material in which the composition of the outer layer did not satisfy the restricted range, namely 6.5 C(%)–1.3 V(%)–0.7 Nb(%)=6.29The rolling load of comparative example G6 was about 20% higher than that of a high Cr cast iron roll, and thus surface roughening of the rolled material occurred. Wear resistance of comparative example G6 was inferior to that of the examples according to the present invention.

It is therefore possible according to the present invention to provide a roll for hot rolling by centrifugal casting exhibiting excellent productivity and economical properties in which an outer layer thereof exhibits excellent wear resistance, a low coefficient of friction and hence an excellent surface roughening inhibiting property, and excellent banding resistance, and a greatly reduced breakage accident occurrence during manufacture or rolling.

What is claimed is:

1. A method of manufacturing a roll for hot rolling, said method comprising the steps of:

centrifugally casting an outer layer material consisting essentially, as analyzed in weight percent, of 2.5–4.0% C, 6.0–20% Cr, 3.0–10.0% V, 0.6–5.0% Nb, 2.0–15% Mo, 3.0% or below Si, 3.0% or below Mn, C, V, Nb and Cr satisfying a following formula (1):

$$10.5(\%) \leq 6.5 \cdot C(\%) - 1.3 \cdot V(\%) - 0.7 \cdot Nb(\%) \leq 2 \cdot Cr(\%) - 2(\%) \quad (1)$$

and the balance being Fe and incidental impurities;

centrifugally casting graphite steel containing 0.5% or above of C as an intermediate layer; and casting an axis material, wherein C is present in said intermediate layer in an amount which satisfies a following formula (2):

$$C \text{ (intermediate layer)} \geq 2.0 - 0.5 \text{ (C} - 0.2 \text{ V} - 0.11 \text{ Nb)(outer layer)}(2).$$

2. The method of manufacturing a roll for hot rolling according to claim 1, wherein the amount of Si in said roll outer layer material is between 0.1 and 1.5%, and the amount of Mn in said roll outer layer material is between 0.1 and 1.2%.

3. The method of manufacturing a roll for hot rolling according to claim 2, wherein said roll outer layer material further contains at least one element selected from a group consisting of 1.0% or below W, 5.0% or below Co and 1.0% or below Ni.

4. The method of manufacturing a roll for hot rolling according to claim 1, wherein a Mo/Cr ratio of said roll outer layer material is 0.25 or above.

5. The method of manufacturing a roll for hot rolling according to claim 2, wherein a Mo/Cr ratio of said roll outer layer material is 0.25 or above.

6. The method of manufacturing a roll for hot rolling according to claim 3, wherein a Mo/Cr ratio of said roll outer layer material is 0.25 or above.

* * * * *